United States Patent
Kornfeld et al.

(10) Patent No.: US 9,524,243 B1
(45) Date of Patent: Dec. 20, 2016

(54) SCALABLE MONOLITHIC DATA STORAGE SYSTEM FOR CLOUD ENVIRONMENT

(71) Applicant: EMC Corporation, Hopkinton, MA (US)

(72) Inventors: Sergey Kornfeld, Waltham, MA (US); Lev Knopov, Brookline, MA (US); Igor Achkinazi, Northborough, MA (US); Luis O. Torres, Shrewsbury, MA (US); Jitender Sawal, Watertown, MA (US)

(73) Assignee: EMC IP HOLDNG COMPANY LLC, Hopkinton, MA (US)

( * ) Notice: Subject to any disclaimer, the term of this patent is extended or adjusted under 35 U.S.C. 154(b) by 62 days.

(21) Appl. No.: 14/039,647

(22) Filed: Sep. 27, 2013

Related U.S. Application Data (63) Continuation-in-part of application No. 13/245,962, filed on Sep. 27, 2011.

(51) Int. Cl.
    G06F 12/08 (2016.01)
(52) U.S. Cl.
    CPC .................. G06F 12/0866 (2013.01)
(58) Field of Classification Search
    CPC .............................. G06F 3/067; G06F 11/1096
    USPC ......................................................... 711/113
    See application file for complete search history.

(56) References Cited

U.S. PATENT DOCUMENTS

| | | | | |
|---|---|---|---|---|
| 5,737,747 | A * | 4/1998 | Vishlitzky | G06F 12/0866 348/E5.008 |
| 5,787,459 | A * | 7/1998 | Stallmo et al. | 711/112 |
| 6,112,257 | A * | 8/2000 | Mason, Jr. | G06F 11/2066 710/18 |
| 6,230,200 | B1 * | 5/2001 | Forecast | G06F 9/50 709/219 |
| 6,907,457 | B2 * | 6/2005 | Merrell et al. | 709/223 |
| 7,233,984 | B2 * | 6/2007 | Mohamed et al. | 709/220 |
| 7,536,693 | B1 * | 5/2009 | Manczak | G06F 3/061 709/226 |
| 7,558,859 | B2 * | 7/2009 | Kasiolas | G06F 3/0605 358/1.16 |
| 7,783,666 | B1 * | 8/2010 | Zhuge | G06F 17/30082 707/783 |
| 7,877,754 | B2 * | 1/2011 | Birkestrand | G06F 9/5011 718/104 |
| 8,443,141 | B2 * | 5/2013 | Beardsley et al. | 711/113 |
| 8,627,012 | B1 * | 1/2014 | Derbeko et al. | 711/135 |
| 2007/0248029 | A1 * | 10/2007 | Merkey et al. | 370/255 |
| 2008/0276057 | A1 * | 11/2008 | Hetzler | 711/159 |
| 2010/0199036 | A1 * | 8/2010 | Siewert et al. | 711/112 |
| 2012/0079187 | A1 * | 3/2012 | Beardsley et al. | 711/113 |
| 2012/0159067 | A1 * | 6/2012 | Kelton et al. | 711/113 |

\* cited by examiner

*Primary Examiner* — David X Yi
*Assistant Examiner* — Ramon A Mercado
(74) *Attorney, Agent, or Firm* — Anderson Gorecki LLP

(57) ABSTRACT

A scalable, storage cloud enabled data center includes a cluster of enterprise storage nodes. Each storage node includes a storage grid, a computation grid, and data availability and data protection modules. The data center is scaled by adding additional storage nodes to a cluster of storage nodes which are interconnected, e.g., via a hardware interface, switches, and switch-routers.

16 Claims, 10 Drawing Sheets

SCALABLE MONOLITHIC DATA STORAGE SYSTEM FOR CLOUD ENVIRONMENT

CROSS-REFERENCE TO RELATED APPLICATIONS

This application is a continuation-in-part of U.S. patent application Ser. No. 13/245,962, filed Sep. 27, 2011, titled CLOUD CAPABLE STORAGE PLATFORM WITH COMPUTATION OPERATING ENVIRONMENT FOR STORAGE AND GENERIC APPLICATIONS, which is incorporated by reference.

BACKGROUND OF THE INVENTION

Aspects of the invention are generally related to data storage, and more particularly to networked data storage systems. An enterprise data storage array such as an EMC Symmetrix® VMAX Storage Array can be used by an organization to maintain availability and protection of large amounts of data. Such storage arrays provide integrated features for maintaining data availability and protecting data from loss. These storage arrays are energy efficient, have a relatively small footprint, and can be scaled in terms of storage capacity. However, they cannot presently be scaled infinitely. Some very large organizations which require infinitely scalable data storage utilize stacks of networked "plain vanilla" servers which are equipped with data storage devices. While such architectures help meet the scalability requirement, they also tend to be inefficient in terms of physical space and energy usage. Moreover, the servers do not provide enterprise level data protection and availability. Relatively simplistic data protection features may be implemented at the application layer using external devices but such systems do not provide functionality and performance equivalent to an enterprise storage array.

SUMMARY OF THE INVENTION

In accordance with an aspect of the present invention, an apparatus comprises: a data center including a cluster of interconnected storage nodes, each storage node including: a computation grid that runs an application and a storage grid that stores data associated with the application, a channel director which retrieves data from a cache in response to a storage protocol request, a disk director that copies requested data from data storage to the cache, and an interface that enables communication between the storage grid and the computation grid for data access in support of the application; and the data center being scaled by adding additional interconnected storage nodes to the cluster.

In accordance with another aspect of the present invention, a method comprises: determining that additional storage nodes are required in a data center including a cluster of existing interconnected storage nodes, each storage node including: a computation grid that runs an application and a storage grid that stores data associated with the application, a channel director which retrieves data from a cache in response to a storage protocol request, a disk director that copies requested data from data storage to the cache, and an interface that enables communication between the storage grid and the computation grid for data access in support of the application; and scaling the data center by adding additional interconnected storage nodes to the cluster.

An advantage associated with at least one aspect of the invention is that latency associated with separation of storage and host computing resources can be mitigated. Another advantage is that each storage node has data availability and data protection modules so these functions are improved relative to external application layer functions. Moreover, the data center can be infinitely scaled by adding additional storage nodes to a cluster of storage nodes which are interconnected via a hardware interface, switches, and switch-routers. These and other advantages of the invention will be more apparent from the detailed description and the drawing.

DETAILED DESCRIPTION

Various aspects of the invention may be implemented partially or completely using computer program code. The computer program code is stored on non-transitory computer-readable memory and utilized by processing hardware. The program code may be provided as a computer program product or be integrated into network equipment.

Figure 1:
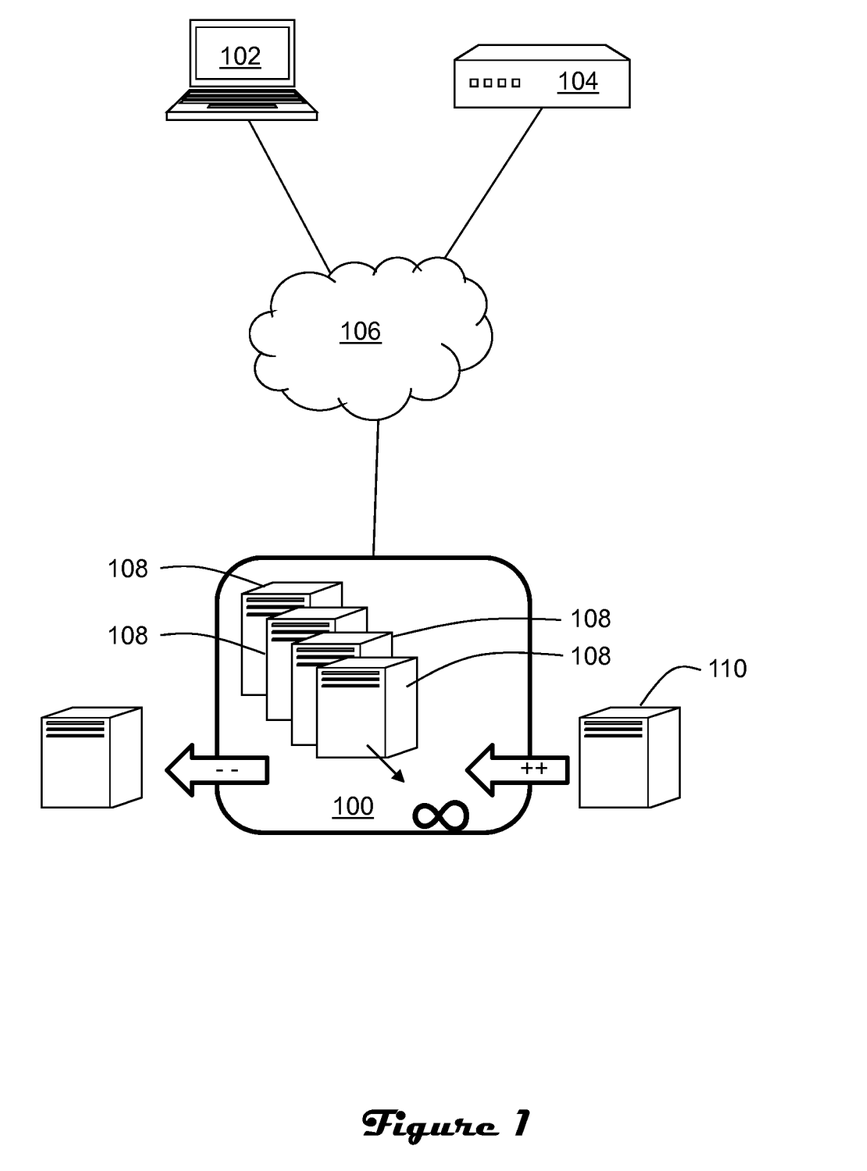
FIG. 1 illustrates a scalable data center in a simplified network environment.

FIG. 1 illustrates a scalable enterprise data center 100 in a simplified network environment. Applications running on computer devices such as a user device 102 or server 104 utilize data maintained by the data center 100. In particular, the computer devices access the data center via a network 106. The data center includes a cluster of enterprise storage nodes 108. The term "enterprise" as used in the art is indicative of a level of functionality and performance that is suitable for use by large corporations for which data loss and data unavailability are unacceptably disruptive to operations. The enterprise storage nodes may be, but are not necessarily, identical. The data center can be scaled in terms of storage capacity and computational capacity by increasing or decreasing the number of enterprise storage nodes in the cluster, e.g. adding an additional storage node 110 or removing an existing storage node 108. Advantageously, the data center can be scaled up infinitely to any desired capacity by increasing the number of storage nodes in the cluster to any desired number of nodes without being limited by architectural limitations. The storage capacity of individual storage nodes may be selected to balance cost, physical size and power requirements such that each additional storage node provides a meaningful amount of additional storage and computing capacity without significantly altering the overall physical size and power consumption of the cluster.

Figure 2:
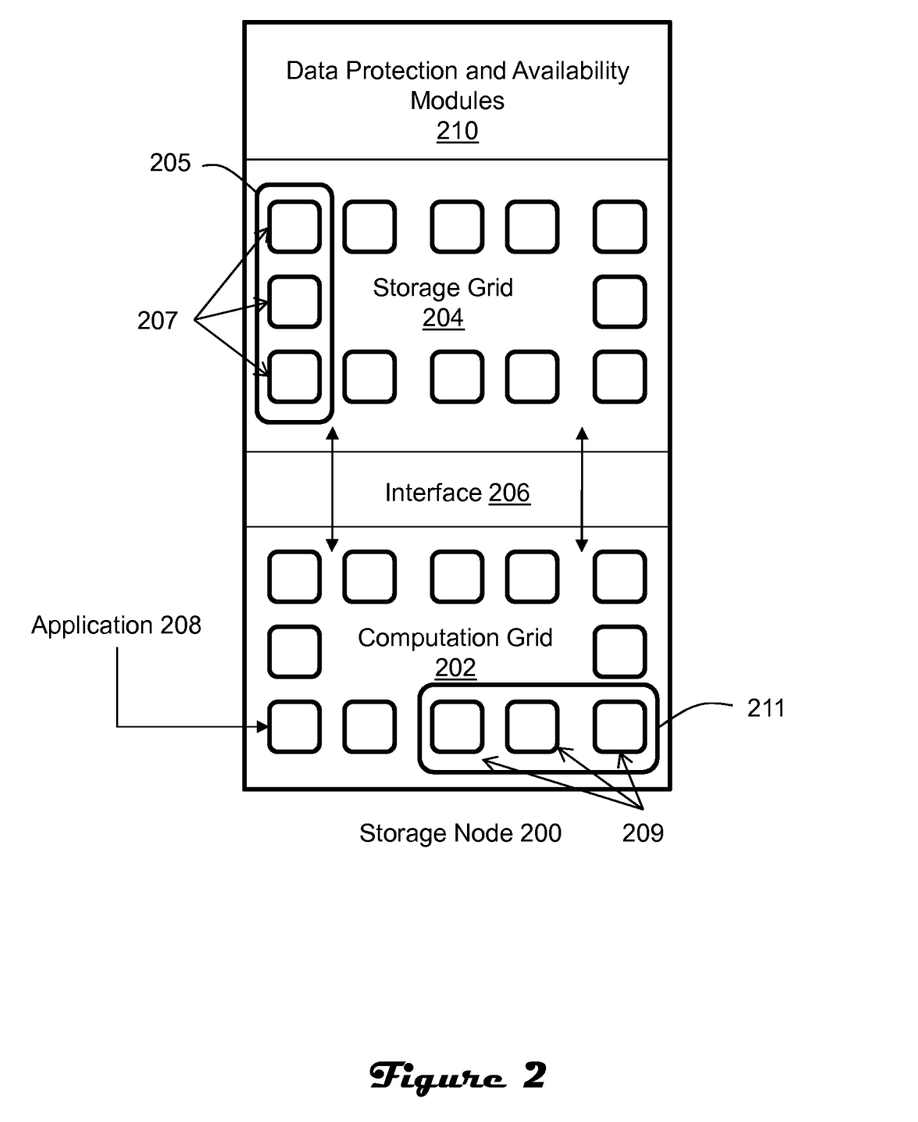
FIG. 2 illustrates an exemplary data storage node in greater detail.

FIG. 2 illustrates an enterprise storage node 200 (which is an example of storage nodes 108, 110 as shown in FIG. 1) in greater detail. The exemplary enterprise storage node 200 includes a storage grid 204 and computation grid 202 which blend storage and compute capabilities via connectivity between the storage grid and the computation grid. The storage grid 204 includes at least one logical storage unit (LU) 205 which is backed by an array of physical storage devices 207 which store data. The computation grid 202 includes separate physical processors or virtual machines 209 which are backed by at least one multi-core physical processor 211 which runs program code. The computation grid runs at least one application 208 that utilizes data maintained by the storage grid. The application may be selected and loaded by a subscriber or owner/operator of the storage platform. The application may also be removed by the subscriber or owner/operator, e.g., for replacement with other applications. An interface 206 allows IO operations to be performed in support of the application. The storage grid and computation grid may be, but are not necessarily, located within a single chassis. A physical part of the interface 206 may include busses, backplanes and switching fabrics that enable fast and wide data transfer.

Figure 3:
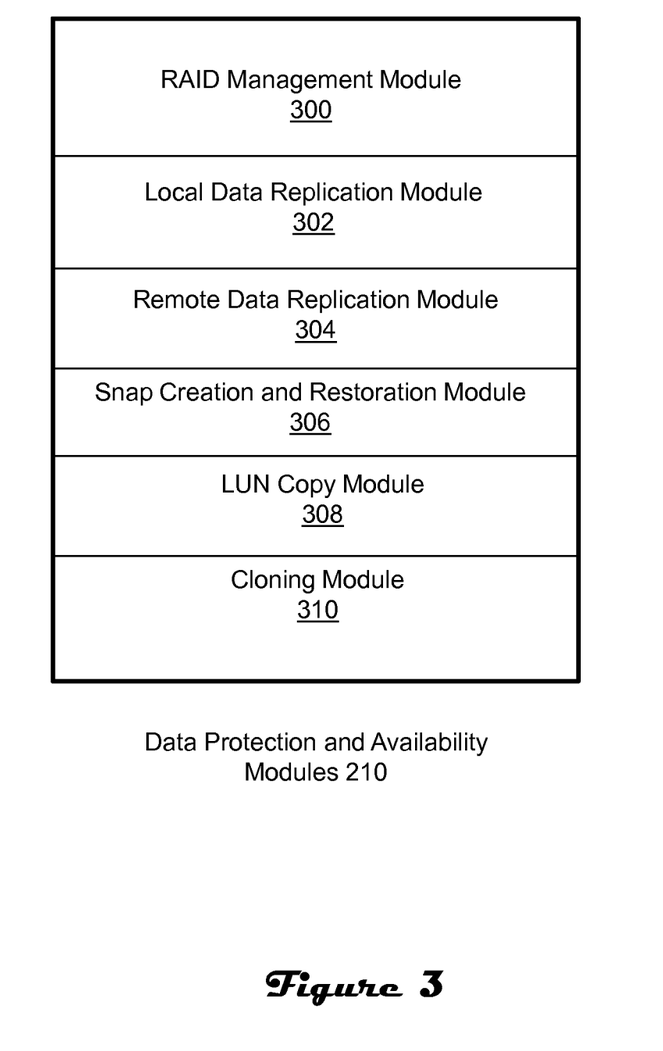
FIG. 3 illustrates data protection and availability modules.

Referring to FIGS. 2 and 3, the storage node 200 includes data protection and availability modules 210 which help provide enterprise level performance. Data protection modules include features which help avoid irreversible loss of data. Data availability modules include features which help ensure that data is continuously available at a required level of performance. Data availability can be measured in terms of how often the data is available, e.g., 99.999 percent availability, and how much data can flow at a time, e.g., N megabytes per second. Computer systems and physical storage devices have a finite lifespan and eventually fail. Further, data can become corrupted due to various errors that occur during normal operation, and entire sites can be damaged or destroyed due to natural disasters. The data protection and availability modules help to avoid problems associated with these and other circumstances. Examples of data protection and availability module features include a redundant array of independent disks (RAID) management module 300, a local replication module 302, a remote replication module 304, a snap creation and restoration module 306, a LUN copy module 308, and a cloning module 310.

The RAID management module 300 implements various standard and customized RAID levels characterized by one or more of striping, mirroring and parity in any of various implementations and combinations. The module operates within the storage node and is not reliant upon application layer programs running on external devices.

The local data replication module 302 creates local copies of data, i.e., copies that reside within the storage grid. Local data replication can be used in support of any of various functions including but not limited to testing, validation, backup, point-in-time recovery, database consistency checks, test, and development. Various types of local copies may be generated, including high performance full source copies, economical space saving copies, and space-efficient snaps. The module operates within the node and is not reliant upon application layer programs running on external devices.

The remote replication module 304 creates remote copies of data, i.e., copies that reside outside the storage node. Remote copies may reside, among various places, on other storage nodes within the data center or on other storage nodes in one or more other data centers. Remote copies may be used for recovery and migration of hosted applications and data in response to, e.g., changes in geographical usage patterns and avoidance of problems associated with a natural disaster in the vicinity of a data center. The module operates within the node and is not reliant upon application layer programs running on external devices.

The snap creation and restoration module 306 allows creation of point-in-time logical images (checkpoints) of a Production File System (PFS). The module also allows regeneration of one or more point-in-time views of a LU and application. The regenerated views can be made accessible to any host or held as point-in-time copies for possible restoration. For instance, a system administrator can make a snapshot session accessible to a backup host so that a production host can continue processing on the source LU without the downtime normally associated with backup processes. The module operates within the node and is not reliant upon application layer programs running on external devices.

The LU copy module 308 provides data copying and transfer functions on a per LU basis. In particular, a LU can be copied and transferred within the storage node or between storage nodes. Exemplary uses include backup to tape, backup to disk, data warehouse refreshes, and replication of databases from one storage system to another without the need for host based replication software. The module operates within the node and is not reliant upon application layer programs running on external devices.

The cloning module 310 makes working clones of existing storage volumes. Clones of production storage volumes can be used for application testing and data mining. A database clone can be used by an application development team to test enhancements. Similarly, a copy of a month-end database can be used for search intensive tasks like recognizing buying habits and price sensitivity. The module operates within the node and is not reliant upon application layer programs running on external devices.

Referring to FIGS. 1 through 3, the storage nodes 200 may obviate the need for servers and other host devices in certain situations. In the illustrated example the user device communicates with a computation node of the storage node via the network directly, rather than through a separate server. Consequently, the latency normally associated with IO operations between a host and storage array performed over a network is mitigated. However, it may be desirable to have the computation grid run applications which require access to the storage grid and have a separate server or servers run applications which do not require access to the storage grid but are required to support a particular service.

Figure 4A:
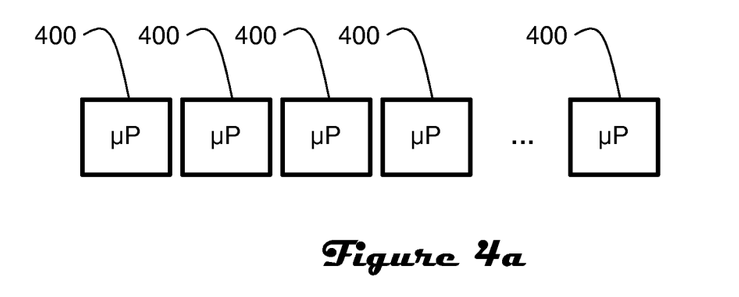
FIGS. 4a and 4b illustrate aspects of the computation nodes.
Figure 4B:
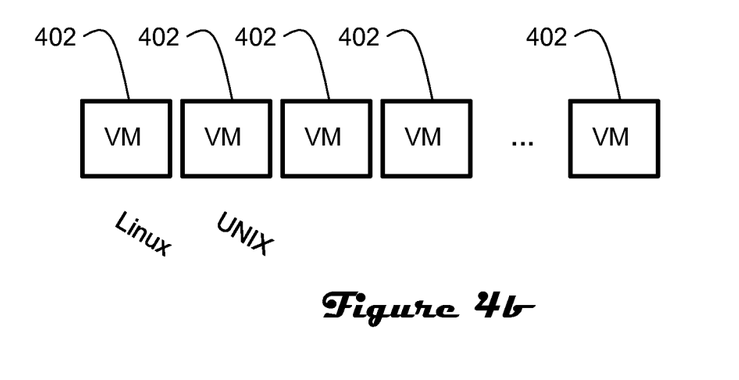

Referring now to FIG. 4a, each computation node may be associated with a separate processor 400 or group of processors, i.e., a separate hardware device or devices. However, as illustrated in FIG. 4b, each computation node may be associated with a separate virtual machine 402, i.e., a separate virtual device which shares the resources of a hardware device or devices. The hardware devices need not be identical, and may be customized to better support particular applications. Similarly, different types of virtual machines may be provided.

Figure 5:
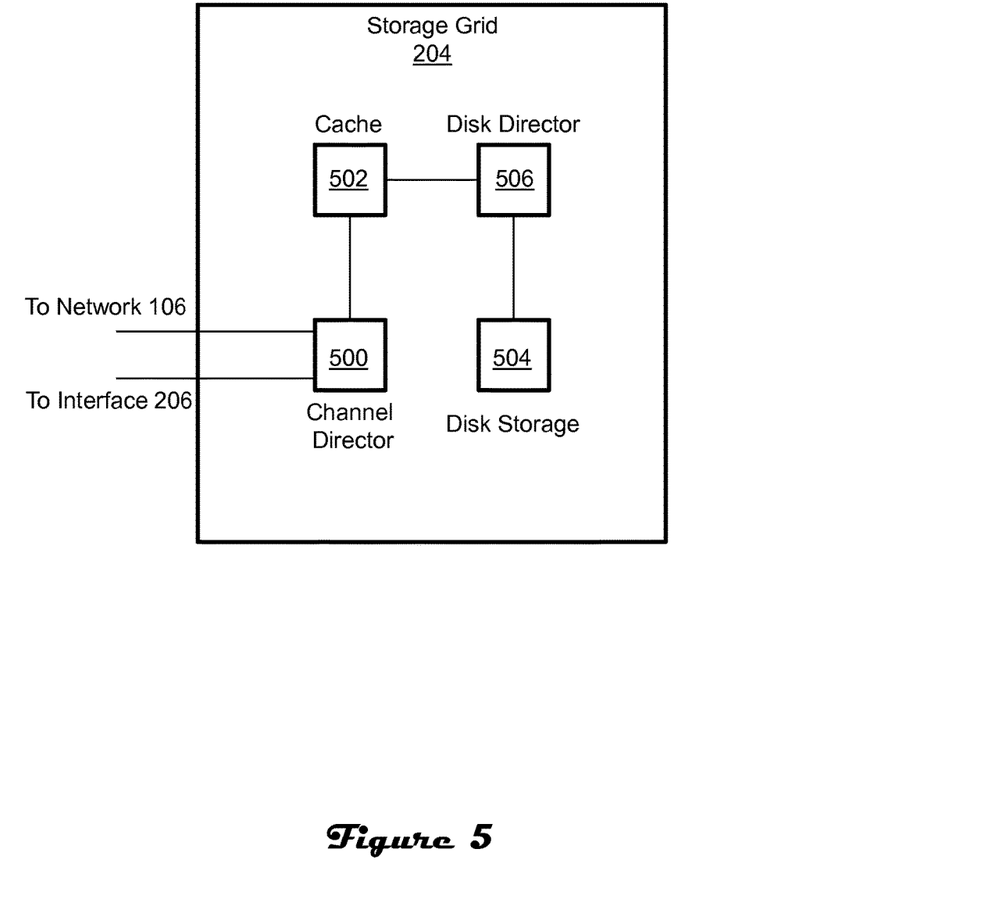
FIGS. 5 through 7 illustrate aspects of the interface.

FIG. 5 illustrates an embodiment of the storage platform in which the interface provides the computation nodes with access to a channel director 500 of the storage grid 204. Basic IO operations include Read and Write operations. A Read Hit occurs when all data necessary to satisfy an IO request is in cache 502 (global memory). In this case the channel director transfers the requested data from the cache to the computation node via interface 206, or to the user via network 102. A Read Miss occurs when the data necessary to satisfy an IO request is not in the cache 502. In this case the data must be retrieved from disk storage 504 so a disk director 506 reads the blocks containing the data from the disks or other devices associated with disk storage and transfers the data to the cache 502. The channel director 500 then transfers the requested data from the cache to the computation node via interface 206, or to the user via network 102. The computation nodes may communicate with the channel director using a standardized protocol, e.g., SCSI commands, or a non-standardized protocol.

Figure 6:
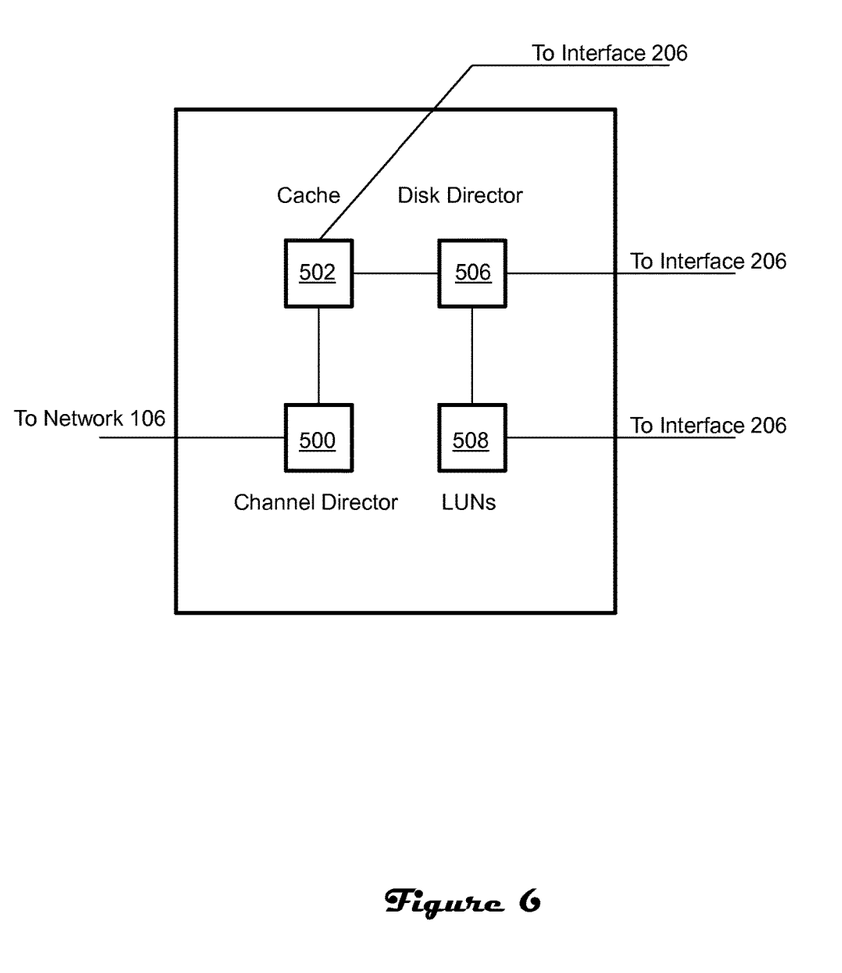

FIG. 6 illustrates an alternative embodiment of the storage platform. In this embodiment the computation nodes may utilize the interface 206 to directly communicate with one or more of the cache 502, disk director 506 and LUNs 508, where each LUN is a logical unit number referring to a logical storage device that may be associated with multiple physical devices of disk storage 504 (FIG. 5). The computation nodes may communicate with the cache 502, disk director 506 and LUNs 508 via the interface 206 using a standardized protocol, e.g., SCSI commands, or a non-standardized protocol. In one embodiment the computation nodes can utilize a direct data placement protocol to perform IO operations with better speed than standardized protocols.

Figure 7:
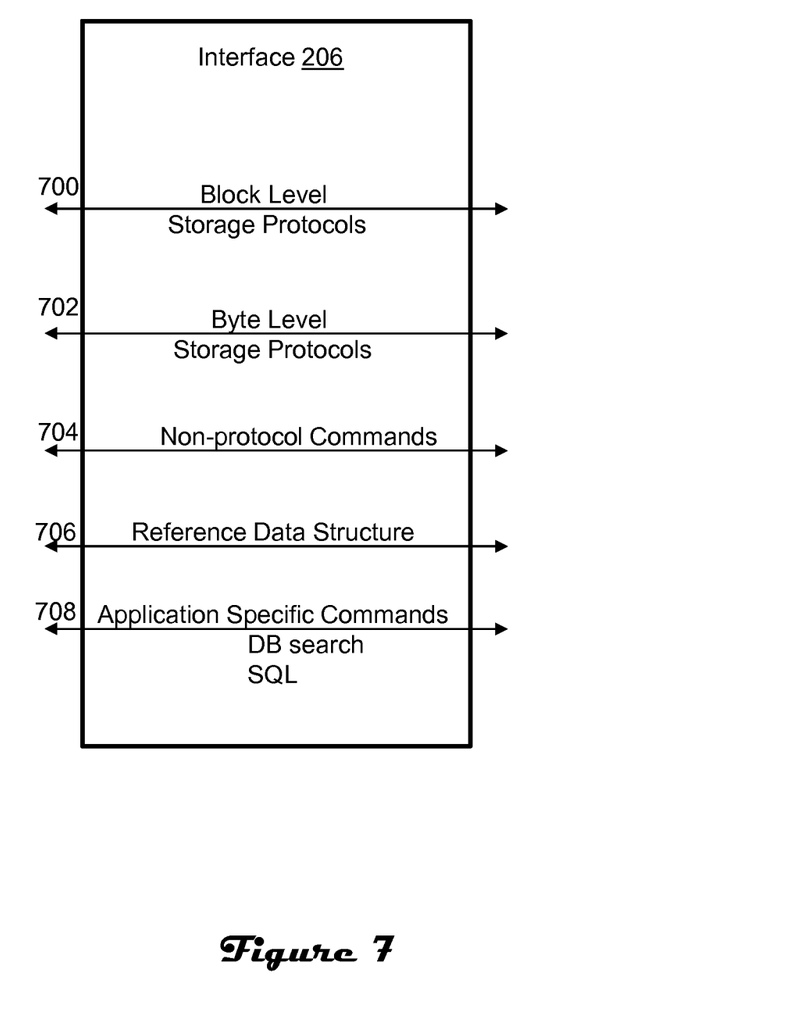

FIG. 7 illustrates aspects of the interface 206. As mentioned above, performance is enhanced by avoiding latency associated with IOs performed across the network. Consequently, the interface may be configured to support block level storage protocols 700 and byte level storage protocols 702 that might otherwise be tunneled over the network. Such embodiments have the advantage of being easily implementable because of the existing infrastructure of applications that are designed to utilize such protocols. However, performance can be further enhanced by removing layers and processing overhead associated with network and storage protocols. For example, the application and storage grid can be tightly integrated via the interface such that non-protocol commands 704 can be utilized. The non-protocol commands can take various forms, including block and byte level commands. Another example is referencing a data structure 706 such as a flat space defined by a range of N bytes addressed 1-N. In this case the application can request the structure, and the interface will respond by providing the corresponding storage. The application can then prompt IOs based on the addresses. The interface translates the addresses into actual locations in the storage array. The interface may also be configured to understand and provide other data structures including but not limited to multi-dimensional arrays. Alternatively, the application may read and write with application specific commands 708 that are native to the application. For example, and without limitation, the interface could respond to database query language commands. In this case the interface may be customized so that the application specific commands can be understood and used to prompt corresponding IOs. The interface and application may also be configured to utilize other features of the storage array. For example, the interface, application, or both can be configured to determine which tier of storage to utilize for particular data. In one embodiment the interface is configured to recognize particular data types such as log files, and automatically store particular types of data in a particular tier of storage. Recognizing data type has the additional advantage that the application can then refer to the data by a type indicator to prompt IOs. In general it will be appreciated that avoiding the "front end" of the storage array can enable performance enhancements.

Figure 8:
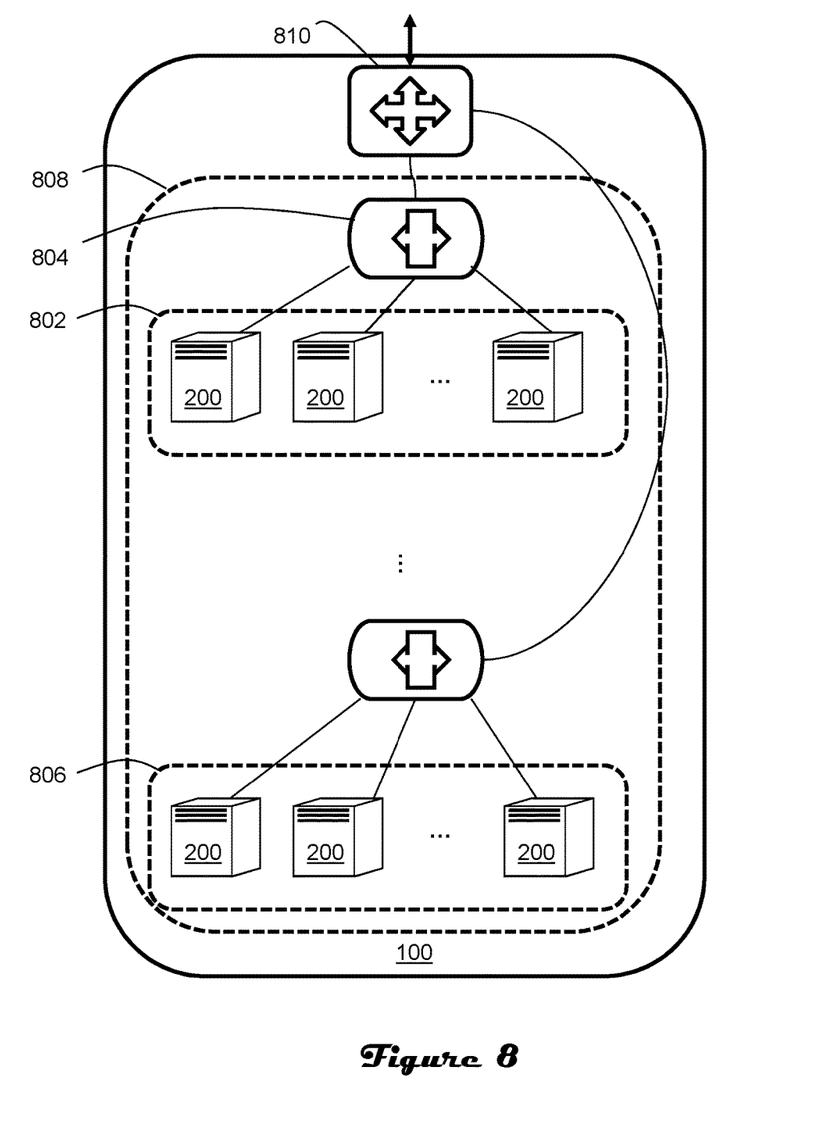
FIG. 8 illustrates scaling via switches and switch-routers.

Referring to FIG. 8, from a management and operational perspective the storage nodes in the data center appear as a selected number (one or more) of entities regardless of the number of storage nodes in the data center. Within exemplary data center 100 a cluster 802 of storage nodes 200 is interconnected via a switch 804 or other interconnecting device. The maximum number of storage nodes in the cluster is a function of the number of ports supported by the switch. However, multiple instances of such clusters, e.g., cluster 802 and cluster 806, can be aggregated into a single cluster 808 by a switch-router or other device 810. Although the number of individual ports on any individual switching or routing device is finite, the number of devices within the data center can be scaled by increasing the number of switching/routing stages within the data center. For example, the number of switch-based sub clusters would be a function of the number of ports supported by the switch-router 810, but other switch-routers could be implemented at the same stage to interconnect with other switches associated with other sub clusters. Each cluster may represent a single LU, multiple LUs, or a portion of a single LU.

Figure 9:
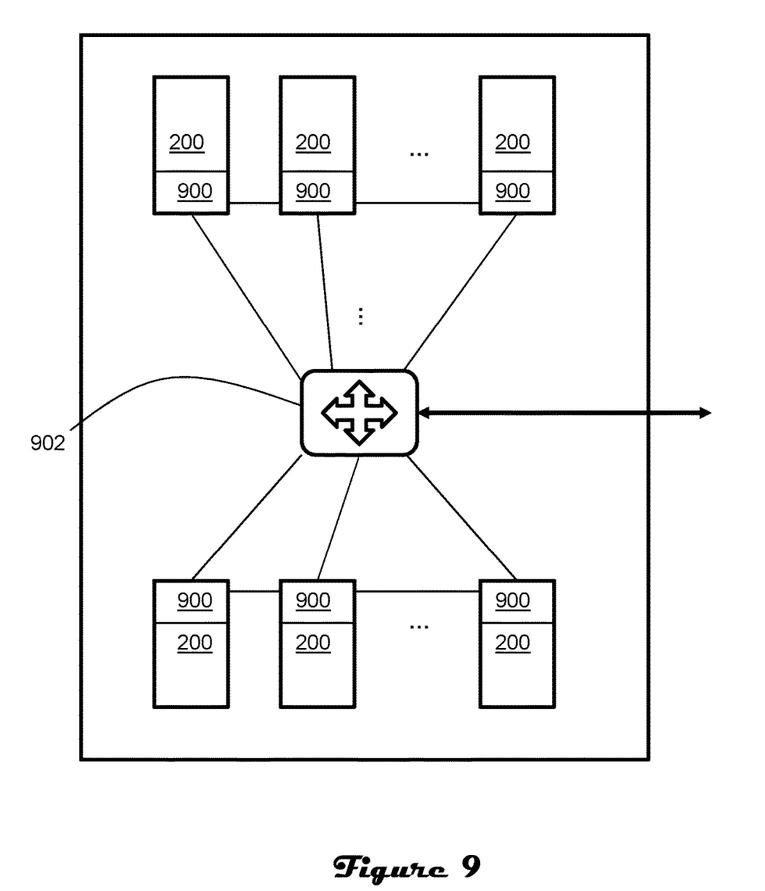
FIG. 9 illustrates scaling via a hardware interface and switch-routers.

Referring to FIG. 9, groups of storage nodes 200 may be interconnected via integrated hardware interfaces 900 that help avoid latency associated with buffering and other processes of switching and routing devices. For example, the storage nodes may be connected in series such that a cluster of storage nodes characterized by connectivity via a common hardware interface can be scaled by connecting another storage node in series. Further, multiple instances of such clusters can be aggregated into a single cluster by a switch-router or other device 902. Each cluster may represent a single LU, multiple LUs, or a portion of a single LU.

Figure 10:
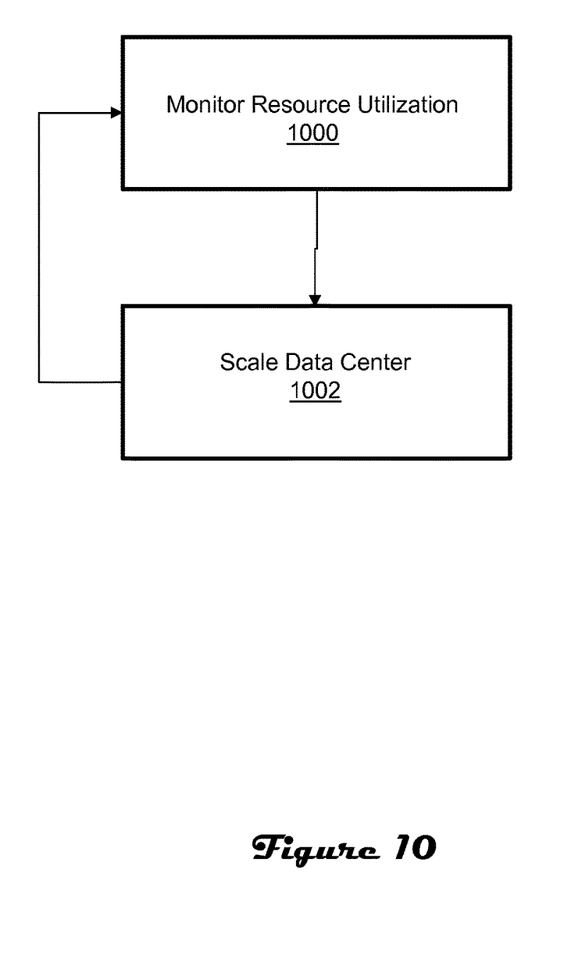
FIG. 10 illustrates a method for scaling the data center.

FIG. 10 illustrates a method for scaling the data center. Resource usage may be monitored in order to determine that additional storage nodes are required as indicated in step 1000. The data center is then scaled by adding additional interconnected storage nodes to the cluster as indicated by step 1002. This may include scaling the storage capacity of the data center, scaling the computing capacity of the data center, or both. Depending on the architecture of the data center and available ports, step 1002 may include interconnecting the additional storage nodes with the existing storage nodes via a hardware interface, interconnecting the additional storage nodes with the existing storage nodes via at least one switch, interconnecting the additional storage nodes with the existing storage nodes via at least one router, or some combination thereof. It should be noted that it is then possible not only to utilize the additional storage and computing capacity, but also to utilize the data protection modules and data availability modules of the additional storage nodes. Moreover, the process continues such that the data center is scaled to whatever capacity is required.

While the invention is described through the above exemplary embodiments, it will be understood by those of ordinary skill in the art that modification to and variation of the illustrated embodiments may be made without departing from the inventive concepts herein disclosed. Moreover, while the embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. An apparatus comprising:
   a data center comprising a plurality of interconnected clusters of interconnected storage nodes, each storage node of a first cluster of the plurality of clusters comprising:
   a computation grid, comprising a plurality of tangible processors, that runs an applications;
   a storage grid, comprising a channel director, a disk director, a cache, and a logical storage unit, that stores data associated with the application, the channel director retrieving at least some of the data associated with the application from the cache in response to a storage protocol request, and the disk director copying requested data associated with the application from data storage that backs the logical storage unit to the cache;
an interface that enables communication between the storage grid and the computation grid for data access in support of the application;
at least one data protection module that protects the data associated with the application from irreversible loss and is not reliant upon an application layer program running on an external device; and
a hardware interface via which the storage node is interconnected to another storage node of the first cluster.

2. The apparatus of claim 1 wherein the storage and computing capacity of the first cluster is scaled by directly interconnecting an additional storage node with at least one of the interconnected storage nodes of the first cluster.

3. The apparatus of claim 1 wherein the storage and computing capacity of the data center is scaled by interconnecting an additional cluster with the first cluster.

4. The apparatus of claim 3 wherein the first cluster and the additional cluster are interconnected via at least one switch.

5. The apparatus of claim 3 wherein the first cluster and the additional cluster are interconnected via at least one router.

6. The apparatus of claim 1 wherein the at least one data protection module comprises one or more of a redundant array of independent disks management module, a local replication module, a remote replication module, a snap creation and restoration module, a LUN copy module, and a cloning module.

7. The apparatus of claim 1 wherein each storage node comprises at least one data availability module.

8. A method comprising:
determining that additional capacity is required in a data center comprising a plurality of interconnected clusters of interconnected storage nodes, each storage node of a first cluster of the plurality of clusters comprising:
a computation grid, comprising a plurality of tangible processors, on which at least one application runs;
a storage grid, comprising a channel director, a disk director, a cache, and a logical storage unit, that stores data associated with the application, the channel director retrieving at least some of the data associated with the application from the cache in response to a storage protocol request, and the disk director copying requested data associated with the application from data storage that backs the logical storage unit to the cache;
an interface that enables communication between the storage grid and the computation grid for data access in support of the application;
at least one data protection module that protects the data associated with the application from irreversible loss and is not reliant upon an application layer program running on an external device; and
a hardware interface via which the storage node is interconnected to another storage node of the first cluster; and
scaling the capacity of the data center by adding an additional interconnected storage node to the data center.

9. The method of claim 8 comprising scaling the capacity of the data center by directly interconnecting the additional storage node with at least one of the interconnected storage nodes of the first cluster.

10. The method of claim 8 comprising scaling the capacity of the data center by interconnecting an additional cluster with the first cluster.

11. The method of claim 9 comprising directly interconnecting the additional storage node and the storage nodes of the first cluster in series via the hardware interfaces.

12. The method of claim 10 comprising interconnecting the first cluster and the additional cluster via at least one switch.

13. The method of claim 10 comprising interconnecting the first cluster and the additional cluster via at least one router.

14. The method of claim 8 comprising protecting the data associated with the application from irreversible loss with the at least one data protection module by utilizing one or more of a redundant array of independent disks management module, a local replication module, a remote replication module, a snap creation and restoration module, a LUN copy module, and a cloning module.

15. The method of claim 8 comprising utilizing at least one data availability module of a storage node of the data center.

16. The apparatus of claim 2 wherein the additional storage node and each storage node of the first cluster are directly interconnected in series via the hardware interfaces.

* * * * *